(No Model.)

F. LANNOY.
METHOD OF MAKING GLASS.

No. 435,936. Patented Sept. 9, 1890.

Witnesses
N. H. Fay
E. E. Pate

Inventor
F. Lannoy
By his Attorneys
Hall and Fay

UNITED STATES PATENT OFFICE.

FRANÇOIS LANNOY, OF TIFFIN, OHIO.

METHOD OF MAKING GLASS.

SPECIFICATION forming part of Letters Patent No. 435,936, dated September 9, 1890.

Application filed May 12, 1890. Serial No. 351,424. (No model.)

*To all whom it may concern:*

Be it known that I, FRANÇOIS LANNOY, a citizen of the United States, and a resident of Tiffin, county of Seneca and State of Ohio, have invented certain new and useful Improvements in the Method of Making Glass, of which the following is a specification, the principle of the invention being herein explained, and the best mode in which I have contemplated applying that principle so as to distinguish it from other inventions.

My invention relates to the production of what is known as "cathedral glass," and the object of my invention is to produce this kind of glass by the blowing process, similarly as ordinary window-glass is made, and at the same time to produce as the result of the blowing a great variety of refracting surfaces upon the glass with the use of but a single mold.

Figure 1:
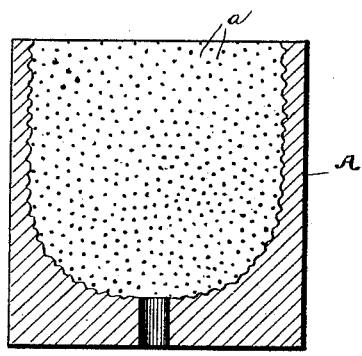
Figure 2:
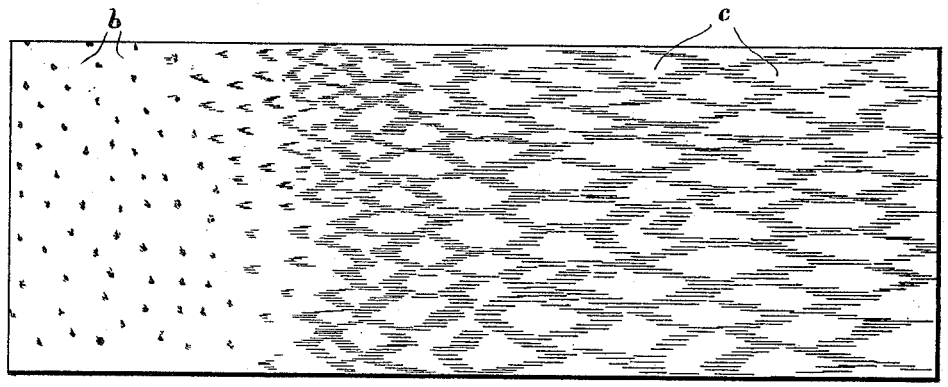

Referring to the drawings, Figure 1 is a central transverse vertical section of the mold employed in carrying out my improved method, and Fig. 2 is a plan view of a portion of a glass plate produced by my said method.

Previous to my present invention the peculiar irregular refracting surface of cathedral glass has been produced by the use of rolls, the surfaces or which are raised and depressed so as to produce corresponding protuberances and cavities on the surface of the glass. This method is not only costly and tedious, but the resulting product is not uniform in quality, and is materially lacking in brilliancy owing to the chilling of the glass by contact with the rolls. Moreover, the variety of refracting contours or surfaces so produced is dependent entirely upon the variety of rolls employed.

It is well known that blown glass possesses the utmost degree of brilliancy and that glass-blowers can by manipulations of their blow-pipes greatly vary the forms and patterns during the operation of blowing. My improved method is based upon these established conditions of the art, and the method may be briefly described as consisting in blowing the mass of glass into a mold, the internal surface of which is formed with a heterogenous mass of small irregularly-shaped cavities, then removing the bubble from the mold and repeatedly blowing and swinging the bubble so as to extend it into cylindrical form, as in window-glass blowing, thus changing the original molded surface, transforming the cavities into grooves of greater or less length and more or less straightness and parallelism, as desired.

By reference to Fig. 1 of the drawings, I will first describe the mold A. This mold is of any material suitable to the purpose of glass-blowing, and within it is formed a cavity either of the precise form shown or of any other desired form, a vent-opening being preferably formed in the base or bottom of the mold, as is customary in blowers' molds. The internal surface of this cavity is, however, of a peculiar character necessary to the proper evolution of my method. This surface is completely covered by a mass of small irregular cavities set closely together, so that the surface of the mold or cavity presents a porous or sponge-like appearance.

I will now describe the manner in which the refracting surfaces are formed upon the glass. The blower inserts a mass of glass at the end of his blow-pipe into the mold, and, by blowing, distends the mass into the form of a bubble which completely fills the cavity or mold. When this bubble is withdrawn from the mold, its outer surface is molded in conformity to the described surface of the mold. The bubble is now distended and elongated into cylindrical form by swinging underhand and whirling overhand, as in ordinary window-glass blowing. This gradually elongates the cavities and protuberances formed by the described surface of the mold, so that the cavities and protuberances are transformed into grooves and ridges. To be more exact, those surfaces of the bubble which are near the tip of the blow-pipe are not materially altered, so that their original molded appearance is practically retained, while farther from the tip the cavities become more and more elongated and finally are transformed into grooves and ridges. Thus at this step of the method a great variety of refracting surfaces will appear upon the finished plate. Now by twirling the blow-pipe axially at intervals during the above-described blowing, swinging, and whirling, the cavities, protuberances, and grooves are distorted fantastically into a great variety of forms. This has been illustrated as nearly as possible in Fig.

2 of the drawings. Subsequently the cylinders thus formed are split longitudinally, and are reheated and flattened out in the manner usual in blown window-glass making, or in any suitable manner, and the sheets may be cut to the required form and sizes, as desired. Usually it is not necessary to set pieces of like surface throughout the window, but where such selection is required it can be easily made. The glass thus made possesses all of the brilliancy of blown glass, and is tougher and can be made much thinner than by the methods heretofore employed.

The foregoing description and accompanying drawings set forth in detail a method embodying my invention. Change may be made therein, provided the principles of operation respectively recited in the following claims are employed. I therefore particularly point out and distinctly claim as my invention—

1. A method of forming cathedral glass, the same consisting in blow-molding upon the surfaces of a mass of glass a number of small cavities and protuberances, then blowing the mass into elongated cylindrical form, then dividing the cylinder longitudinally and bending it to required shape, substantially as set forth.

2. A method of forming cathedral glass, the same consisting in blow-molding upon the surfaces of a mass of glass a number of small cavities and protuberances, then blowing the mass into elongated cylindrical form and simultaneously imparting axial rotative movement to the mass, then dividing the cylinder longitudinally and bending it to required shape, substantially as set forth.

In testimony that I claim the foregoing to be my invention I have hereunto set my hand this 28th day of April, A. D. 1890.

FRANÇOIS LANNOY.

Witnesses:
CHARLIE GLENCE,
JNO. W. LEAHY.